United States Patent [19]
Tamura et al.

[11] Patent Number: 4,973,440
[45] Date of Patent: Nov. 27, 1990

[54] METHOD FOR PRODUCTION OF FIBER-REINFORCED THERMOSETTING RESIN MOLDING MATERIAL

[75] Inventors: Katsushige Tamura, Akashi; Shigehiro Yamamoto, Matsubara; Terukuni Hashimoto, Itami; Hideo Saijyo, Takatsuki, all of Japan

[73] Assignee: Nippon Shokubai Kagaku Kogyo Co., Ltd., Osaka, Japan

[21] Appl. No.: 324,215

[22] Filed: Mar. 15, 1989

[51] Int. Cl.$^5$ .......................... B05D 1/28; B29C 43/22
[52] U.S. Cl. .......................... 264/114; 239/7; 239/220; 264/8; 264/109; 264/112; 264/119
[58] Field of Search .................. 264/109, 114, 112, 8, 264/119; 239/7, 220

[56] References Cited
U.S. PATENT DOCUMENTS

| | | | |
|---|---|---|---|
| 3,932,980 | 1/1976 | Mizutani et al. | 53/111 R |
| 4,115,089 | 9/1978 | Metz et al. | 65/19 |
| 4,358,415 | 11/1982 | Tachimoto et al. | 264/8 |
| 4,474,604 | 10/1984 | Nakamura et al. | 264/8 |
| 4,523,621 | 6/1985 | Ray | 264/8 |
| 4,702,872 | 10/1987 | Yamamoto et al. | 264/114 |

*Primary Examiner*—Mary Lynn Fertig
*Attorney, Agent, or Firm*—Omri M. Behr

[57] ABSTRACT

A method for the production of a fiber-reinforced molding material of thermosetting resin, which method comprises supplying a liquid thermosetting resin composition to at least one spreading roller disposed as separated by a gap of not more than 5 mm from the terminal of a supply unit, rotated at speed in the range of 1,000 to 7,000 r.p.m., and provided on the circumferential source thereof with at least one ridge or groove formed parallelly to the rotary axis thereof, thereby causing the liquid thermosetting resin composition to be spread out in the form of particles, allowing said particles to be mixed with separately spread reinforcing fibers, piling the resultant mixture, and then deaerating the piled mixture thereby causing the reinforcing fibers in the piled mixture to be impregnated with the resin composition.

10 Claims, 1 Drawing Sheet

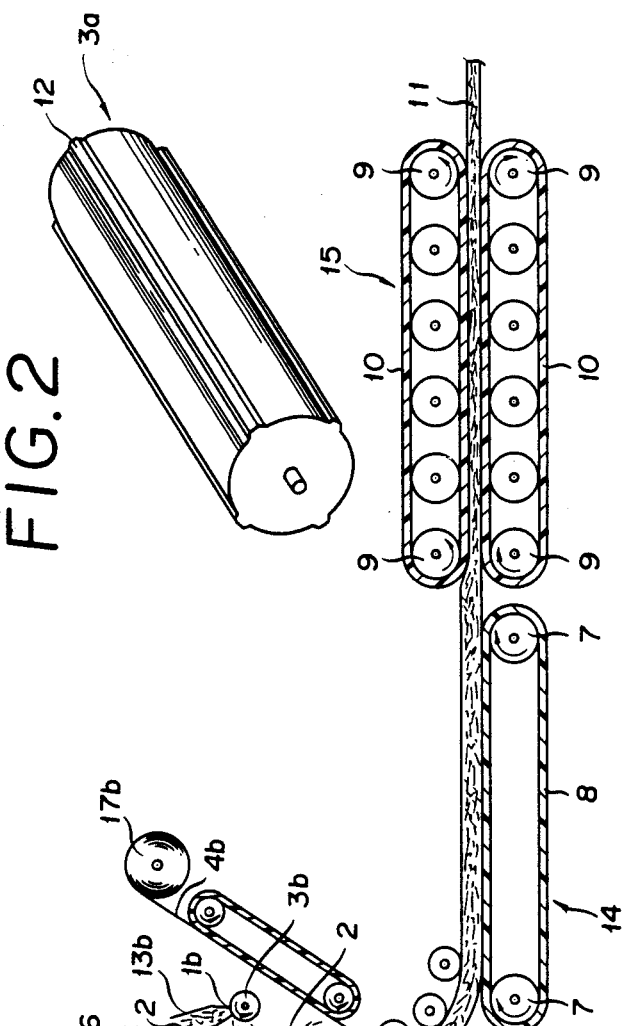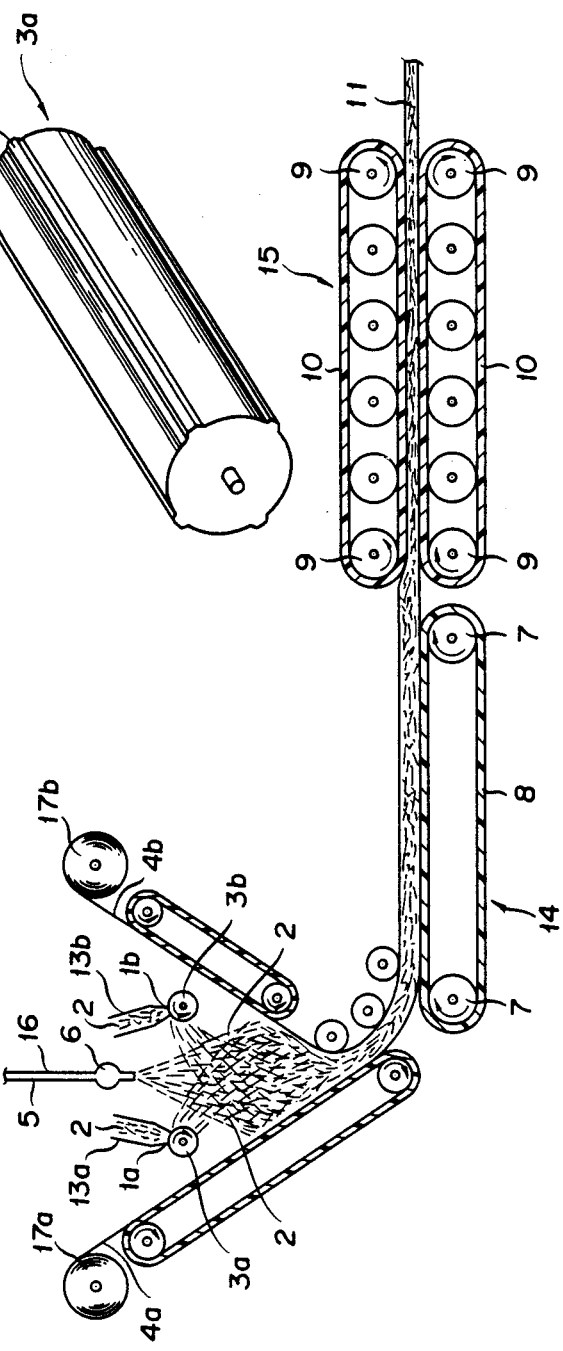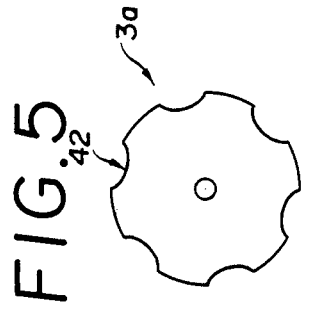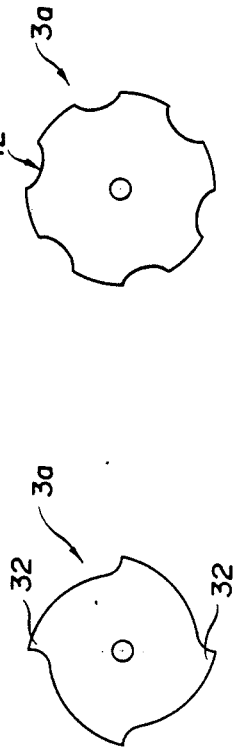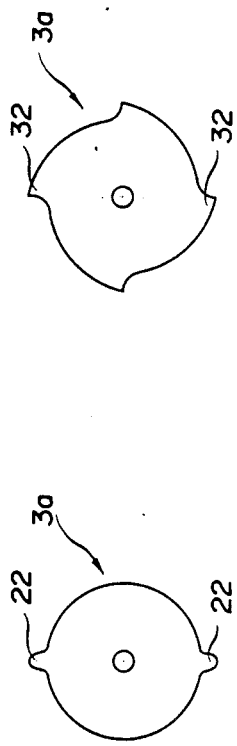

METHOD FOR PRODUCTION OF FIBER-REINFORCED THERMOSETTING RESIN MOLDING MATERIAL

BACKGROUND OF THE INVENTION

1. Field of the Invention:

This invention relates to a method for the production of a fiber-reinforced thermosetting resin molding material. More particularly, this invention relates to a method for the production of a fiber-reinforced thermosetting resin molding material having a liquid thermosetting resin composition and reinforcing fibers dispersed in and mixed with each other without exertion of any immoderate force and having the reinforcing fibers satisfactorily impregnated with the thermosetting resin composition without infliction of any breakage.

2. Description of the Prior Art:

Generally, the fiber-reinforced thermosetting resin molding material for hot pressing or injecting is obtained by combining the thermosetting resin liquid such as unsaturated polyester resin with additives such as fillers, mold release agents, thickening agents, and coloring agents thereby producing a viscous liquid thermosetting resin composition and mixing this resin composition with reinforcing fibers such as glass fibers thereby enabling the fibers to be impregnated with the resin composition. At the time of molding, therefore, the molding material so produced is tack free enough to ensure ease of handling. Heretofore, the sheet molding compound (SMC) supplied in the form of sheet and the bulk molding compound (BMC) suplied in bulk have been mainly used. As compared with the SMC process which causes a liquid composition of relatively low viscosity and reinforcing fibers to be mixed with each other and thereby enabling the reinforcing fibers to be impregnated with the resin composition, the BMC process generally involves impregnation with a resin composition incorporating a large amount of filler and exhibiting high viscosity and, therefore, has no alternative but to use a powerful stirrer such as a kneader in attaining satisfactory mixture of the liquid resin composition with the reinforcing fibers and consequent impregnation of the reinforcing fibers with the resin composition.

In accordance with the conventional BMC process, the staple cutting length of reinforcing fibers for use in the molding material is short, falling on the order of ½ inch to ¼ inch. Moreover, this process has the disadvantage that the reinforcing fibers, while being kneaded with the resin composition, eventually reach the point of sustaining breakage under the shearing force generated because of the stir by a kneader and the shaped article produced by using the consequently obtained molding material suffers from insufficient strength. As the molding material of required consistency is produced in consequence of the stirring by the kneader, it is removed from the stirring tank by the use of an extruder, wide difference of strength occurs between the portion of the material removed during the first half of the whole duration of removal of one lot of produced material and the portion removed during the latter half of the duration. From the standpoint of quality control, therefore, the conventional BMC process possesses the drawback that the molding material obtained in one lot has its strength heavily dispersed from one part to another.

In the conventional SMC process, reinforcing fibers are spread between layers of liquid resin composition applied one each on two opposed polyethylene films and the layer of the reinforcing fibers as nipped between the layers of liquid resin composition is pressed with a roller so as to cause impregnation of the reinforcing fibers with the resin composition. The sheet molding material produced by any method of this principle, therefore, has a thickness generally on the order of 2 to 3 mm at most. By simply increasing the amount of the resin composition to be applied and the amount of the fibers to be spread, the sheet molding material of increased thickness cannot be obtained with high productivity.

As a means of enabling reinforcing fibers to be most easily mixed and impregnated with a resin composition without entailing infliction of breakage, the method which comprises applying the resin composition on a pair of rollers and nipping a layer of chopped glass fibers between the aforementioned rollers thereby causing the glass fibers to be impregnated with the resin composition by virtue of the pressure exerted by the opposed rollers upon the layer of glass fibers has been known to the art (U.S. Pat. No. 3,932,980). This method is basically identical with the SMC process because it causes the glass fibers to be impregnated with the resin composition of high viscosity by virtue of the pressure of the opposed rollers. Accordingly this method enables the impregnation to proceed only to a limited extent. Particularly when the resin composition so used has high viscosity and the glass fibers' content in the produced molding material is high, it is extremely difficult for the resin composition to provide proper impregnation of the glass fibers. Further the impregnation is not obtained sufficiently because it is instantaneously effected solely by the linear pressure generated while the resin composition and the glass fibers are passing between the opposed rollers. The glass fibers are injured because they are exposed instantaneously to the excessive force. The mixture of glass fibers and resin composition emerging from the pair of nip rollers is scraped off these nip rollers with a rotary roller. Since this rotary roller is operated at a high speed, the glass fibers in the scrapped mixture are liable to be disentangled and the shaped article produced by using the mixture is liable to suffer from degradation of strength. A more important thing is the fact that this method has low productivity. The combined amount of the resin composition and the glass fibers to be passed between the paired nip rollers per unit time and the speed of their passage have their limites. When the rotational speed of the rotary rollers is increased, the impregnation is not obtained to a sufficient extent. This method, therefore, has the drawback that it is difficult to increase productivity.

As a means of solving problems of this nature, the spray method is known which enables chopped glass fibers to be mixed and blended most effectively with a resin composition. In accordance with the spray method, however, the highest viscosity the resin composition is tolerated to possess in order to be effectively divided into fine particles by spraying is only on the order of 20 to 30 poises. The highest viscosity the resin composition is tolerated to possess to be effectively divided into coarse particles by spraying is only on the order of 100 poises.

In contrast, the liquid resin composition generally used for BMC has viscosity in the range of 1,000 to 10,000 poises. Thus, the resin composition cannot be supplied by the spray method to the glass fibers.

As the result of studies for the solution of the problems involved in the conventional BMC method, SMC method, or spray method as described above, we have found the fact that a fiber-reinforced molding material of thermosetting resin possessing usually unattainable excellent impact strength is efficiently obtained by spreading a liquid thermosetting resin composition of high viscosity in the form of particles and allowing these particles of resin composition to be mixed with separately spread reinforcing glass fibers without exertion of immoderate force owing to the use of two kinds of rollers. The invention materializing this finding has been already filed for patent (Japanese Patent Laid-Open No. SHO 60(1985)-97,808 and U.S. Pat. No. 4,702,872).

In the method of the patent application mentioned above, the fact that the two kinds of rollers, i.e. transferring (primary) rollers operated at a high speed in the range of 200 to 1,000 r.p.m. and spreading (secondary) rollers disposed at a slight distance from the transferring rollers and operated at a higher speed in the range of 3,000 to 10,000 r.p.m., are to be installed appreciably adds to the implication and size of the mechanism of spreading devices and increases the cost of equipment. An idea .of designing the spreading (second) rollers for high-speed rotation in a detachable form and adapting the two kinds of rollers so as to be separated with a controlled gap is impracticable because these rollers are operated at high speeds. From the operational point of view, since the two kinds of rollers are operated as juxtaposed to each other, this method has a disadvantage that the rollers cannot be easily cleaned after use.

In the method mentioned above, the resin composition supplied onto the transferring (primary) rollers is spread out in the form of particles by the spreading (secondary) rollers rotated at a high speed as separated by a gap from the transferring (primary) rollers. Part of the resin composition so supplied onto the transferring (primary) rollers adheres persistently on the surface of the transferring (primary) rollers because of the viscosity. The adhering resin composition constitutes itself a cause for impairing the uniform dispersion and mixture of the resin composition and the reinforcing fibers. When the part of the resin composition thus adhering to the transferring (primary) rollers continues to remains completely irreplaceable with the freshly supplied resin composition, the adhering resin composition on the surface of the transferring (primary) rollers gains in viscosity. With elapse of time, the adhering resin composition of increased viscosity forms a layer on the surface of the rollers. Pieces of viscous resin composition which subsequently peel off the surface of the rollers are suffered to intervene between superposed piles of separately spread reinforcing fibers and interfere with desired uniform mixture and impregnation of the reinforcing fibers with the resin composition, to pose a problem.

An object of this invention, therefore, is to provide a novel method for the production of a fiber-reinforced molding .material of thermosetting resin.

Another object of this invention is to provide a method for the production of a fiber-reinforced molding material of thermosetting resin, which method enables a liquid thermosetting resin composition and reinforcing fibers to be uniformly dispersed and mixed with each other, avoids inducing breakage of the reinforcing fibers, and exhibits very high productivity.

Still another object of this invention is to provide a method for the production of a fiber-reinforced molding material of thermosetting resin, which method permits an apparatus for the production of the molding material, especially a device for the spreading of resin composition, to be handled with high operational efficiency and stably attains the uniform dispersion and mixture of the resin composition and the reinforcing fibers without requiring the apparatus to be given any protracted maintenance.

SUMMARY OF THE INVENTION

The objects described above are accomplished by a method for the production of a fiber-reinforced molding material of thermosetting resin, which method comprises supplying a liquid thermosetting resin composition to at least one spreading roller disposed as separated by a gap of not more than 5 mm from the terminal of a supply unit, rotated at a speed in the range of 1,000 to 7,000 r.p.m., and provided on the circumferential surface thereof with at least one ridge or groove formed parallelly to the rotary axis thereof, thereby causing the liquid thermosetting resin composition to be spread out in the form of particles, allowing the particles to be mixed with separately spread reinforcing fibers, piling the resultant mixture, and then deaerating the piled mixture thereby causing the reinforcing fiber in the piled mixture to be impregnated with the resin composition.

BRIEF DESCRIPTION OF THE DRAWINGS

FIG. 1 is an explanatory diagram illustrating a typical apparatus for the production of a fiber-reinforced molding material of thermosetting resin as one embodiment of this invention, FIG. 2 is a perspective view illustrating a spreading roller, FIG. 3 is a cross section illustrating another typical spreading roller embodying the present invention, FIG. 4 is a cross section illustrating yet another typical spreading roller embodying the present invention, and FIG. 5 is a cross section illustrating still another typical spreading roller embodying the present invention.

DESCRIPTION OF THE PREFERRED EMBODIMENT

The liquid thermosetting resin composition to be used in the present invention is obtained by mixing a radically polymerizable resin such as unsaturated polyester resin or vinyl ester resin which assumes a liquid state at normal room temperature with such additives as fillers, thickeners, mold release agents, curing catalysts, coloring agents, shrinkage diminishing agents, and ultraviolet absorbents which are generally used in the art. The viscosity of the resin composition is in the range of 100 to 10,000 poises, preferably 1,000 to 3,000 poises.

The unsaturated polyester resin is obtained by preparing an unsaturated polyester, i.e. a polycondensate between an acid component comprising an alpha,beta-unsaturated dibasic acid such as maleic acid or fumaric acid and/or anhydride thereof and optionally a saturated polybasic acid such as phthalic anhydride, tetrahydrophthalic anhydride, tetrachlorophthalic anhydride, or succinic anhydride and a polyhydric alcohol such as ethylene glycol, diethylene glycol, propylene glycol, 1,3-butanediol, or hydrogenated bisphenol A and then dissolving the unsaturated polyester with a vinyl monomer such as styrene, vinyl toluene, or diallyl phthalate. The vinyl ester resin is obtained by deriving a compound such as an epoxy resin or a modification thereof from bisphenol A, bisphenol F, brominated bisphenol A, phenol novolak, brominated phenol novolak, or cresol novolak and epichlorohydrin and/or 2-methyl epichlorohydrin and possessing at least two epoxy groups in the molecular unit thereof, esterifying the compound mentioned above with acrylic acid or methacrylic acid thereby forming a vinyl ester, and dissolving the vinyl ester in a vinyl monomer such as styrene, vinyl toluene, or diallyl phthalate.

The reinforcing fibers to be used in the present invention may be inorganic fibers such as glass fibers or carbon fibers or organic fibers such as vinylon fibers or Alamides fibers. These reinforcing fibers may be short-staple fibers or continuous fibers.

The method for the production of the fiber-reinforced molding material of thermosetting resin according to this invention, as described above, comprises supplying a liquid thermosetting resin composition onto at least one spreading roller rotated at a speed in the range of 1,000 to 7,000 r.p.m. as separated by a gap of not more than 5 mm from the terminal of a supply unit, and provided on the circumferential surface thereof with at least one ridge or groove formed parallelly to the rotary axis thereof, thereby causing the resin composition to be spread in the form of particles, causing the particles to be mixed with separately spread reinforcing fibers, piling the resultant mixture, and deaerating the piled mixture thereby enabling the reinforcing fibers in the piled mixture to be impregnated with the resin composition.

The thermosetting liquid resin composition which has been prepared by incorporation of such additives as fillers, mold release agents, curing agents, coloring agents, and thickener into resin composition is supplied so as to be extruded from a supply terminal attached to the leading end of a pipe or hose and provided with a slit or a plurality of orifices.

After departure from the supply terminal, the liquid thermosetting resin composition is brought into contact with the spreading roller and, by virtue of the centrifugal force of the roller in motion, dispersed in the form of particles or short threads. In this case, it is important that the resin composition should be uniformly transferred and brought into contact with the roller in motion at a high speed and the resin composition thus brought into contact with the roller should be released from the roller surface in the form of particles or short threads. To fulfil the requirement, the revolution number of the roller must be in the range of 1,000 to 7,000 r.p.m. preferably 3,000 to 6,000 r.p.m. If the revolution number exceeds 7,000 r.p.m., the resin composition cannot be uniformly transferred and brought into contact with the roller and the release of the resin composition from the roller cannot be controlled and, as a result, the resin composition is flung by the roller and prevented from uniformly contacting the roller compelled to form a pool at the supply terminal. The resin composition collecting in the pool is unevenly dropped and scattered and consequently prevented from being spread out in a desirable state. Conversely, if this revolution number is less than 1,000 r.p.m., the resin composition separates from the roller with difficulty, adheres to the roller, unevenly falls and scatters, and prevents itself from being spread in a desirable state.

The roller is in a special shape provided on the circumferential surface thereof with at least one ridge or groove, preferably a plurality of spaced ridges or grooves, disposed parallelly to the axial direction thereof so that the resin composition will be easily released and spread in a desirable state. If the roller is destitute of such a ridge or groove and is flat, neither the contact of the resin composition with the spreading roller nor the release of the resin composition from the roller is carried out smoothly. Thus, the resin composition cannot be spread satisfactorily in the form of particles or short threads. The diameter of the roller (except that the portion of the ridge or groove) is in the range of 2 to 30 cm, preferably 5 to 15 cm. The height of the ridge is generally in the range of 0.5 to 10 mm, preferably 1 to 4 mm. The depth of the groove is in the range of 0.5 to 10 mm, preferably 1 to 4 mm.

The gap between the supply terminal for the thermosetting liquid resin composition and the spreading roller must be not exceeds 5 mm, preferably in the range 0.1 to 3 mm. If this gap exceeds 5 mm, the resin composition extruded through the supply terminal cannot be uniformly dispersed and mixed with the reinforcing fibers. In the case of the roller which is provided on the circumferential surface thereof with a ridge, the "gap" mentioned above means the shortest distance between the leading end of the ridge and the supply terminal.

The supply terminal may be in the form of a slit 0.5 to 5 mm wide formed in the direction of rotary axis of the spreading roller or a multiplicity of orifices 1 to 5 mm across disposed similarly, so that the resin composition may be supplied at uniformly extruded throughout the entire length of the spreading roller in the direction of rotary axis thereof.

In the present invention, the gap between the supply terminal for the thermosetting liquid resin composition and the circumferential surface of the spreading roller is not more than 5 mm and the revolution number of the roller is suitably selected in the range of 1,000 to 7,000 r.p.m., depending on the amount of the resin composition to be supplied and the diameter of the roller. It is particularly desirable to select the gap in the range of 0.1 to 3 mm and the revolution number in the range of 3,000 to 6,000 r.p.m.

Now, a working embodiment of this invention using an unsaturated polyester resin in a liquid form as a thermosetting liquid resin, glass fibers as reinforcing fibers, and two spreading rollers will be described below with reference to the accompanying drawings.

FIG. 1 is an explanatory diagram illustrating one embodiment of this invention. A liquid resin composition 2 prepared by thoroughly mixing an unsaturated polyester resin with filler, mold release agent, coloring agent, thickener, curing catalyst, etc. is extruded through supply terminals 1a and 1b of resin supply units 13a and 13b onto spreading rollers 3a and 3b kept rotated at a high speed in the range of 1,000 to 7,000 r.p.m. as separated by a gap of not more than 5 mm from the supply terminals 1a and 1b. The spreading rollers 3a and 3b, as illustrated in FIG. 2, are each provided on the circumferential surface thereof with four ridges 12, 2 mm in height, disposed in the direction of rotary axis so as to facilitate the release of the resin composition from the surface.

The resin composition 2 which has brought into contact with the spreading rollers 3a and 3b, by virtue of the centrifugal force generated by the rollers 3a and 3b in motion at a high speed, is projected in the form of particles or short threads onto filmy objects 4a and 4b being conveyed by a conveying unit 14 or an impregnating and deaerating unit 15. For the spreading of the resin composition to be carried out effectively, the surface of the spreading rollers is desired to be coated with a membrane of layer of a fluorinated carbon resin (Teflon) or silicone rubber which excels in mold releasing property. The filmy objects 4a and 4b are each a plastic film such as of polyethylene or polypropylene and are supplied from rolls 17a and 17b.

The glass fibers are supplied from a fiber supply unit 16 which is installed on the resin composition spreading side (in the case of the construction of FIG. 1, in the intermediate part between the pair of rollers 3a and 3b in motion in mutually opposite directions because these rollers are disposed as separated by a fixed gap from each other). The fiber supply unit 16 may be in a varying form. For example, a glass robing 5 paid out of a roll (not shown) is cut into pieces of a stated length with a pneumatically driven chopper 6 and then blown off. The cutter to be used herein comprises a cylindrical metallic roller having glass fiber cutting blades embedded in the circumferential surface thereof and a rubber roll adapted to be pressed against the metallic roller. An electric motor or a pneumatic motor is employed for the operation of the metallic roller. When a long cutter is used which has a length fit for the width of resin composition spreading as in the apparatus for SMC production, the cutter is adapted for stationary operation. When a short cutter (chopper) is used as in a spray-up machine, the cutter is adapted to be reciprocated at a desired speed in the direction perpendicular to a belt 8 of a conveying unit 14, so as to ensure distribution of fibers throughout the entire width of resin composition spreading.

The resin composition which has been spread by the spreading roller in the form of particles or short threads is allowed to mix with uniformly spread glass fibers. The resultant mixture is deposited fast on the plastic films 4a and 4b and, then as held between the two films 4a and 4b subsequently opposed juxtapositionally to each other advanced to a conveyor unit 14 comprising rollers 7 and 7 and a belt 8, and further transferred to an impregnating and deaerating unit 15 comprising impregnating and deaerating rollers 9,9, . . . and belts 10, 10. A fiber-reinforced molding material of thermosetting resin 11 resulting from the impregnation and deaeration of the mixture is formed in the shape of sheet or plate and then put to storage. The thickness of the molding material is decided essentially by the amount of the resin composition piled on the film, amount of supplying the glass fiber, and conveying speed, and it is also decided by the viscosity of the resin composition and the working pressure set for the impregnating and deaerating unit.

FIG. 3 is a cross section illustrating another typical spreading roller to be used for the method of this invention. This spreading roller is provided with two ridges 22. FIG. 4 is a cross section illustrating yet another spreading roller which is provided on the circumferential surface thereof with four ridges 32, which are each sloped sharply in one direction and slowly in the other direction. FIG. 5 is a cross section of a further typical spreading roller provided with six grooves 42.

One working examples have been described as resorting to use of a pair of spreading rollers adapted to be rotated in mutually opposite directions. It is naturally permissible to use one spreading roller per fiber supplying unit or to use two or more pairs of spreading rollers and correspondingly two or more fiber supplying units.

Example

Platelike molding materials (15 mm in thickness) were produced with apparatuses illustrated in FIGS. 1 and 2, using resin composition having additives incorporated at varying ratios shown in Table 1 in a low-profile unsaturated polyester resin (produced by Nippon Shokubai Kagaku Kogyo Co., Ltd. and marketed under trademark designation of "EPOLAC N-11"). The two (a pair) of spreading rollers 3a and 3b used in the production had a diameter of 100 mm and were operated at a rotational speed of 5,000 r.p.m. The gap between the supply terminals 1a and 1b for the resin composition and the spreading rollers 3a and 3b was 0.5 mm and the clearance between the spreading rollers 3a and 3b was 200 mm. The length of glass fibers (robing) was 0.5 inch. During a total of 5 hours of continuous working of this method, absolutely no change was recognized in the state of resin composition spreading. The physical properties of flat pressed articles of the molding materials were as shown in Table 1.

Control

The BMC grade molding materials obtained of the composition shown in Table 1 by the conventional method were tested by following the procedure of Example 1. The results were as shown in Table 1.

TABLE 1

|  | Conventional method (BMC) | Method of this invention |
|---|---|---|
| Composition of molding material | | |
| Low-profile unsaturated polyester resin (EPOLAC N-11) (wt %) | 27.4 | 29.1 |
| Filler (calcium carbonate, average particle diameter 2 microns) (wt %) | 50.8 | 49.0 |
| Mold release agent (zinc stearate) (wt %) | 1.27 | 1.09 |
| Curling agent (t-butyl peroxybenzoate) (wt %) | 0.30 | 0.27 |
| Coloring agent (chrome yellow) (wt %) | 1.02 | 0.27 |
| Thickener (magnesium oxide) (wt %) | 0.17 | 0.27 |
| Glass fibers (chopped fiber strand) (wt %) | 19.0 | 20.0 |
| Viscosity of resin composition (Poise) | 6,340 | 1,330 |
| Shape of molding material | massive | plate-like (15 mm) |
| Strength of press-molded article | | |
| Tensile strength (Kg/mm$^2$) | 4.1 | 5.7 |
| Tensile modulus of elasticity (kg/mm$^2$) | 1,210 | 1,150 |
| Flexural strength (kg/mm$^2$) | 9.6 | 10.9 |
| Bending modulus of elasticity (kg/mm$^2$) | 1,060 | 1,000 |
| Impact strength (kg cm/cm$^2$) (Izot flatwise) | 25.2 | 45.1 |

TABLE 1-continued

| | Conventional method (BMC) | Method of this invention |
|---|---|---|
| Dispersion in impact strength in one lot (Charpy, U notch) (kg cm/cm$^2$) | 17.8–33.6 | 42.6–53.8 |

By the method of the present invention, a fiber-reinforced molding material of thermosetting resin having reinforcing fibers uniformly dispersed in an unbroken state therein can be easily and inexpensively produced without requiring any appreciable alteration of the conventional common BMC composition and without requiring use of mixing and impregnating device of a complicated mechanism. Further by the adoption of the method of the present invention, the supply terminal for the resin composition can be removed whenever the spreading roller is required to be completely cleaned. The apparatus used for the production, therefore, is not required to use any specific measure to cope with the possible increase in viscosity of the resin composition due to the persistent adhesion of the resin composition to the roller surface. Thus, the apparatus enjoys easy maintenance and notably improved operational efficiency. The present invention, accordingly, permits the fiber-reinforced molding material of thermosetting resin capable of producing shaped articles of outstanding impact strength to be produced continuously and stably.

What is claimed is:

1. A method for the production of a fiber-reinforced molding material of thermosetting resin, which method comprises:
    (a) supplying a liquid thermosetting resin composition having a viscosity in the range of 100 to 10,000 poises to at least one spreading roller to cause said resin composition to be spread out in the form of particles and to allow said particles to be mixed with separately spread reinforcing fibers, said spreading roller being disposed as separated by a gap in the range of 0.1 to 3 mm from a slit or a multiplicity of orifices formed in the direction of rotary axis of said spreading roller, rotated at a speed in the range of 1,000 to 7,000 r.p.m., and provided on the circumferential surface thereof with at least one ridge of 0.5 to 10 mm in height or groove of 0.5 to 10 mm in depth formed parallely to said rotary axis thereof;
    (b) piling the resultant mixture; and then
    (c) deaerating the piled mixture thereby causing said reinforcing fibers in said piled mixture to be impregnated with said resin composition.

2. A method according to claim 1, wherein at least one pair of spreading rollers is used.

3. A method according to claim 2, wherein one pair of spreading rollers adapted to be rotated in mutually opposite directions are used and said reinforcing fibers are supplied to the gap between said two rollers.

4. A method according to claim 1, a plurality of ridges or grooves are formed as separated by an equal interval on the circumferential surface of said spreading roller.

5. A method according to claim 4, wherein the number of ridges is 4.

6. A method according to claim 1, wherein said rollers have a diameter in the range of 2 to 30 cm.

7. A method according to claim 1, wherein the rotational speed of said spreading rollers is in the range of 3,000 to 6,000 r.p.m.

8. A method according to claim 1, wherein said liquid thermosetting resin is an unsaturated polyester resin and said reinforcing fibers are glass fibers.

9. A method according to claim 8, wherein said molding material is a bulk molding compound.

10. A method according to claim 8, wherein said molding material is a sheet molding compound.

* * * * *